March 30, 1971 — M. RIO — 3,573,227
ABSORBENT FOR CARBON DIOXIDE

Filed Jan. 31, 1969 — 2 Sheets-Sheet 1

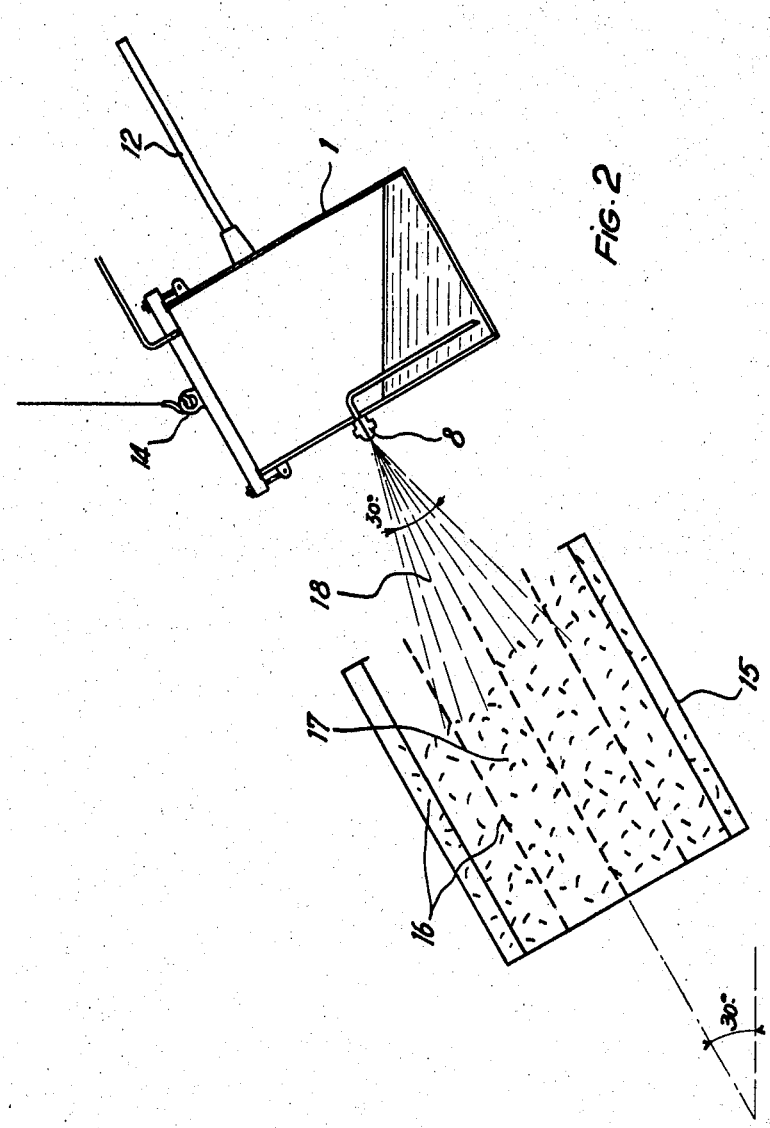

United States Patent Office 3,573,227
Patented Mar. 30, 1971

---

3,573,227
ABSORBENT FOR CARBON DIOXIDE
Michel Rio, Champigny, France, assignor to L'Air Liquide, Societe Anonoyme pour l'Etude et l'Exploitation des Procedes Georges Claude, Paris, France
Continuation-in-part of application Ser. No. 677,085, Oct. 23, 1967. This application Jan. 31, 1969, Ser. No. 795,463
Claims priority, application France, Dec. 19, 1968, 179,202
Int. Cl. B01j 11/58
U.S. Cl. 252—454       2 Claims

ABSTRACT OF THE DISCLOSURE

An absorbent for carbon dioxide comprising a mineral which has an expanded lamellar structure and which is hydrophilic and inert to carbon dioxide which has been coated by a layer of sodium hydroxide sprayed thereon in molten state in such a manner that it solidifies almost instantaneously without any attack of the mineral by the sodium hydroxide at the fusion temperature.

---

Figure 1:
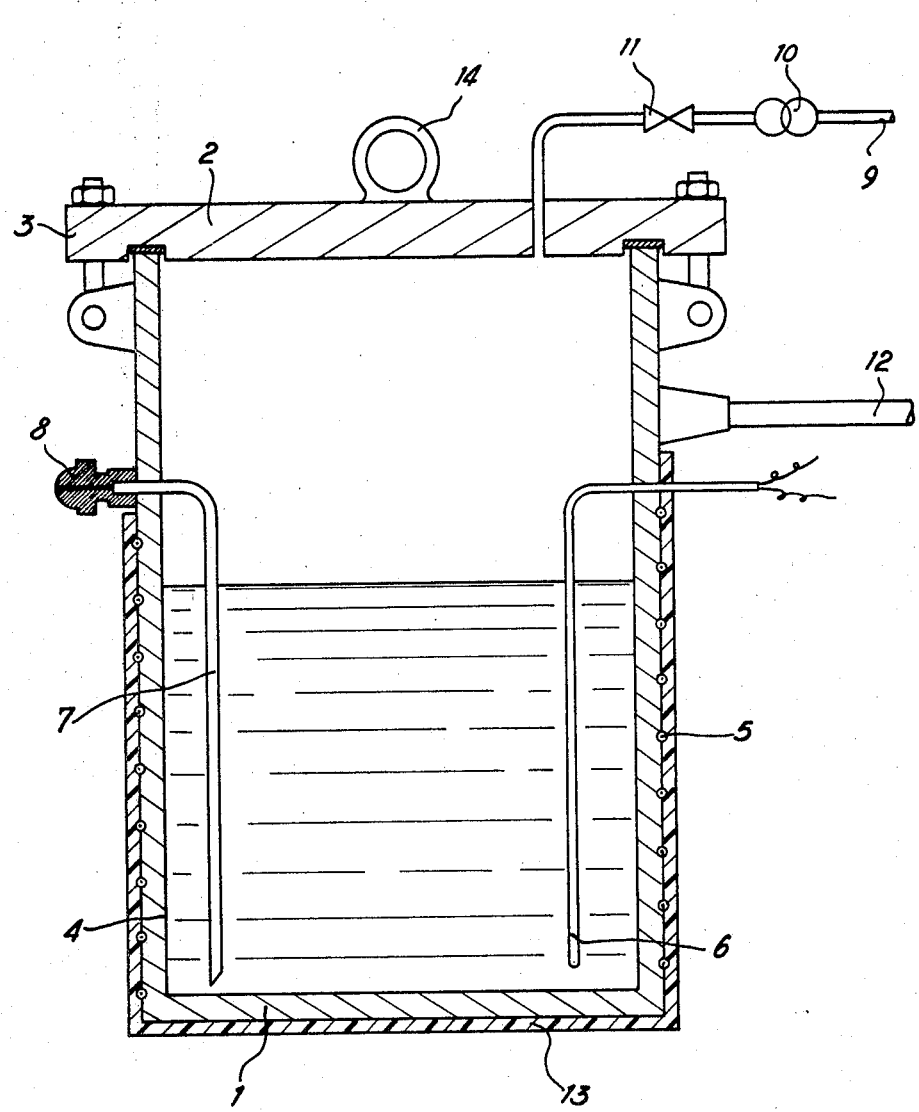

The present application is a continuation-in-part of application Ser. No. 677,085 filed Oct. 23, 1967, now abandoned.

This invention relates to an absorbent for carbon dioxide.

The elimination of carbon dioxide present in atmospheres of all natures is of great importance. Whether the atmosphere concerned be that of a space capsule, of a submarine, of a closed-circuit respiratory apparatus or of a chamber for the preservation of fruit or for the accelerated ripening thereof, problems are always encountered in regard to the elimination of carbon dioxide. Each problem usually has a particular aspect peculiar thereto. It is therefore desirable to determine which one of the many products which are available to the user for fixing carbon dioxide is likely to afford the best solution. This choice generally depends upon the technical and economical requirements inherent in each particular problem; for example, it is obvious that for space capsules consideration of the weight of absorbent necessary for the duration of the experiment dominate all other considerations, whereas this is not the main problem where it is necessary to maintain a particular atmosphere in a chamber for the accelerated ripening of fruit.

Generally speaking, the two main criteria serving to determine the comparative merits of various absorbents for carbon dioxide are the cost and the specific absorption which may be defined as the mass of carbon dioxide absorbed by unit mass of absorbent under well-defined conditions of use. Thus, soda lime, which is a relatively costly reactant and which is very widely employed, has a specific absorption of 250 mg. of carbon dioxide per gram of soda lime, under conditions of use corresponding to the respiratory level of a human being making a mean effort of 100 watts. On the other hand, slaked lime, which is an economical product employed for maintaining atmospheres of chambers for the accelerated ripening of fruit, possesses a specific absorption of the order of 40 to 50 mg. of carbon dioxide per gram of slaked lime.

In the parent application, Ser. No. 677,085, an absorbent for carbon dioxide is claimed which is a uniform mixture of sodium hydroxide in the solid state and a hydrophilic mineral compound having an expanded lamellar structure such as exfoliated mica. This absorbent was found to have a specific absorption in the order of 280 mg. of carbon dioxide per gram of reactant under conditions of use corresponding to a respiratory level of a human being making a mean effort of 100 watts.

Due to the great difference in density between the flakes of sodium hydroxide and the grains of expanded mica, for example, there is the possibility of a segregation of the two constituents appearing when the product is subjected to mechanical vibration.

The present improvement relates to an absorbent for carbon dioxide which eliminates this possible difficulty and wherein mechanical behavior and performance are improved.

These and other advantages of the present invention will be more apparent from the following detailed description, taken in conjunction with the drawings, wherein:

FIG. 1 is a cross-sectional view of the apparatus used for the fusion and spraying of the sodium hydroxide constituent; and FIG. 2 is a similar view showing the arrangement of apparatus for spraying the sodium hydroxide onto the fluidized bed of expanded mica.

The absorbent of the present invention is comprised of a mineral compound having an expanded lamellar structure which has its outer contours covered by a layer of sodium hydroxide.

The sodium hydroxide can be either the anhydrous soda or a hydrated soda having 69–72% by weight of pure sodium hydroxide. This hydrate melts between 62–65° C.

The mineral having an expanded lamellar structure can be, for example, a complex silicate of alumina-potassium hydroxide or complex silicates of various other bases such as magnesia, iron oxides, and lithium hydroxide; the mineral is advantageously an exfoliated mica.

The improved absorbent for carbon dioxide according to the present invention is one wherein the sodium hydroxide is physically bound to the expanded lamellar mineral structure, and is obtained by spraying the melted sodium hydroxide in the heated state onto the mineral, such as expanded mica, preferably in a fluidized bed such that the sodium hydroxide is almost instantaneously solidified thereon.

Whichever form of sodium hydroxide is used, the spraying is so controlled as to deposit it onto the exterior contours of the expanded mica grains and to avoid a penetration thereof to the interior of the foliated structure of the mica. In order to accomplish this, it is necessary that the droplets of the sprayed sodium hydroxide be very fine to result in the almost instantaneous solidification at the time of their impact onto the mica.

In use, the layer of sodium hydroxide deposited comes into direct contact with the gas to be purified; the sodium hydroxide liquefies entirely by absorption of the moisture contained in the gas to be purified before being neutralised by the carbon dioxide. Due to the hydrophilic character of the mica, the sodium hydroxide solution formed by absorption of the moisture in the gas passes over and between the different lamellae of mica and the liquid also supplies a very large surface of contact for the gas. The bicarbonates and carbonates formed precipitate progressively holding onto the water in their crystalline systems. The sodium hydroxide solution solidifies entirely.

According to the present invention, during its use the sodium hydroxide solution form first enters the internal macroporosity of the expanded mica grain before being neutralised and solidifying thereon. The precipitation of the carbonates and bicarbonates takes place preferentially on the external contours of the expanded mica grain but the solid formed by the accumulation of the precipitated crystals is itself porous and serves as a support for the sodium hydroxide solution which then migrates to the interior of the grain. This process which permits an important specific absorption is only possible to the same extent where the solid sodium hydroxide is initially on the exterior of the layers of mica and thus in direct contact with the gas. When the sodium hydroxide is originally absorbed to the interior of the porous materials such as pumice, diatomaceous earth or kieselguhr, the reaction process is limited to the external surface of the material and the reaction efficiency is much less and the specific absorption of carbon dioxide is weak. On the contrary, a material endowed with a very large surface and an elevated macroporosity, in the order of a millimeter, such as the expanded mica, and not the mica in its natural state, permits obtaining a high reaction efficiency and in consequence an elevated specific absorption of carbon dioxide to 354 mg. of carbon dioxide per gram of reactant.

Further, the film constituting the deposited sodium hydroxide reenforces the mechanical stability of the expanded mica grains.

There is now described in a non-limiting manner, the process used for the fusion and the spraying of the sodium hydroxide constituent.

The solid sodium hydroxide is placed in a metallic fusion receptacle 1 provided with a cover 2 having a ring 14 thereon for handling. The cover 2 is attached to the receptacle 1 in a water-tight manner by means of an appropriate joint 3. The fusion receptacle 1 is faced on the interior thereof with a protective film 4 which is inert to the molten soda and is further provided with a heating resistance 5 as well as a pyrometric rod 6. The molten soda is drawn off by the tube 7 connected through the wall of receptacle 1 to a sprayer 8 which functions, for example, on the principle of fuel burners. The cover 2 is provided with a suitable discharge pipe by which it is possible to place the fusion receptacle 1 under pressure by means of compressed and dry air or nitrogen. A pressure reducer valve 10 and the valve 11 permit the regulation of the presence of the propulsion gas.

When the soda is entirely molten, the heating is regulated so that the temperature is maintained at about 350° C. in the fusion receptacle. The spraying is released by the placing of pressure in the receptacle by means of the valve 11. A handling rod 12 fixed onto the body of the receptacle 1 permits the orientation of the spray cone of the sodium hydroxide onto the expanded mica.

The fusion receptacle 1 is thermically insulated by means of a covering of asbestos 13. All of the components in contact with the molten soda are protected with a suitable coating which is chemically resistant to the molten soda.

As shown in FIG. 2, the expanded mica is placed in a cylindrical vat 15 inclined at about 30° to the horizontal and propelled to a speed of rotation regulated in a manner such that the mica falls back in a high shower to the base of the receptacle. The vat 15 is charged to about 30% of its capacity with expanded mica. The blades 16 disposed along the generatrices of the cylinder permit better mixing of the mass of expanded mica.

The fusion receptacle 1 is positioned near the vat 15 and oriented in such a manner that the cone of spray 18 of about 30° is directed onto the fluidized bed 17 and sweeps over all its surface. This operation is effected by means of the handling rod 12 with the fusion receptacle 1 suspended by means of the ring 14. The distance between fluidized bed 17 and the sprayer 8 is determined in a manner so as to realize a spraying wherein the droplets of molten soda solidify almost instantaneously upon their impact on the mica, to avoid all alkaline fusion of the mica.

An illustrative example of the improved process is as follows.

150 g. of expanded mica are placed in a cylindrical vat of 5 l. capacity and provided with 6 mixing blades 2 cm. long. The vat is rotated at a rate of 2 turns per second.

1 kg. of anhydrous soda is placed in the fusion receptacle. When fusion is obtained the temperature is regulated in the bath of molten soda at 350° C. and the sprayer is preheated by means of a small blow pipe. Then the fusion receptacle is rapidly placed under a pressure of dry nitrogen of about 0.8 bar. The flow from the sprayer is regulated in a manner such that all of the molten soda is sprayed in 15–20 minutes. A distance of 30 cm. is maintained between the sprayer and the fluidized bed of expanded mica.

The absorbent obtained is placed in a cylindrical receptacle in the form of a bed of 100 cm.$^2$ per section and of 25 cm. length. A current of air at 20° C. having 90% relative humidity and containing 1% of carbon dioxide by volume is passed through the bed of absorbent in a continuous flow of 30 l./min. Under these conditions, the quantity of carbon dioxide retained by the absorbent is 354 mg. of carbon dioxide per gram of reagent, when the content of carbon dioxide downstream reaches 0.4% by volume. The losses of charge do not exceed 1 millibar.

What is claimed is:

1. A process for the preparation of absorbent for absorbing carbon dioxide from a gas comprising exfoliated mica having a hydrophilic expanded lamellar structure with internal macro porosity having solely its external surfaces covered by a layer of solidified molten sodium hydroxide wherein the layer of sodium hydroxide is deposited by spraying droplets of a molten sodium hydroxide onto said exfoliated mica so that the sodium hydroxide solidifies almost instantaneously and only on the external surfaces of said exfoliated mica.

2. A process according to claim 1, wherein the exfoliated mica is maintained in a fluidized bed during the spraying of the sodium hydroxide thereon.

References Cited

UNITED STATES PATENTS

| | | | |
|---|---|---|---|
| 1,396,586 | 11/1921 | Mase | 252—192 |
| 1,441,696 | 1/1923 | McNeil | 252—192 |
| 2,030,239 | 2/1936 | Byers | 252—378 |
| 2,967,153 | 1/1961 | Houston | 252—378X |

OTHER REFERENCES

Zonolite—Chemical and Physical Properties of Vermiculite, Chicago, Ill., 1954, p. 9.

DANIEL E. WYMAN, Primary Examiner

C. F. DEES, Assistant Examier

UNITED STATES PATENT OFFICE
CERTIFICATE OF CORRECTION

Patent No. 3,573,227   Dated March 30, 1971

Inventor(s) M. RIO

It is certified that error appears in the above-identified patent and that said Letters Patent are hereby corrected as shown below:

Column 3, line 5, after "porous" insert --material as in the case of the currently used porous--

Signed and sealed this 13th day of July 1971.

(SEAL)
Attest:

EDWARD M. FLETCHER, JR.
Attesting Officer

WILLIAM E. SCHUYLER,
Commissioner of Paten